Jan. 19, 1937. E. X. SCHMIDT 2,068,436
APPARATUS FOR DETERMINING THE TOTAL HEATING
VALUE PER UNIT VOLUME OF COMBUSTIBLE GASES
Filed April 25, 1935
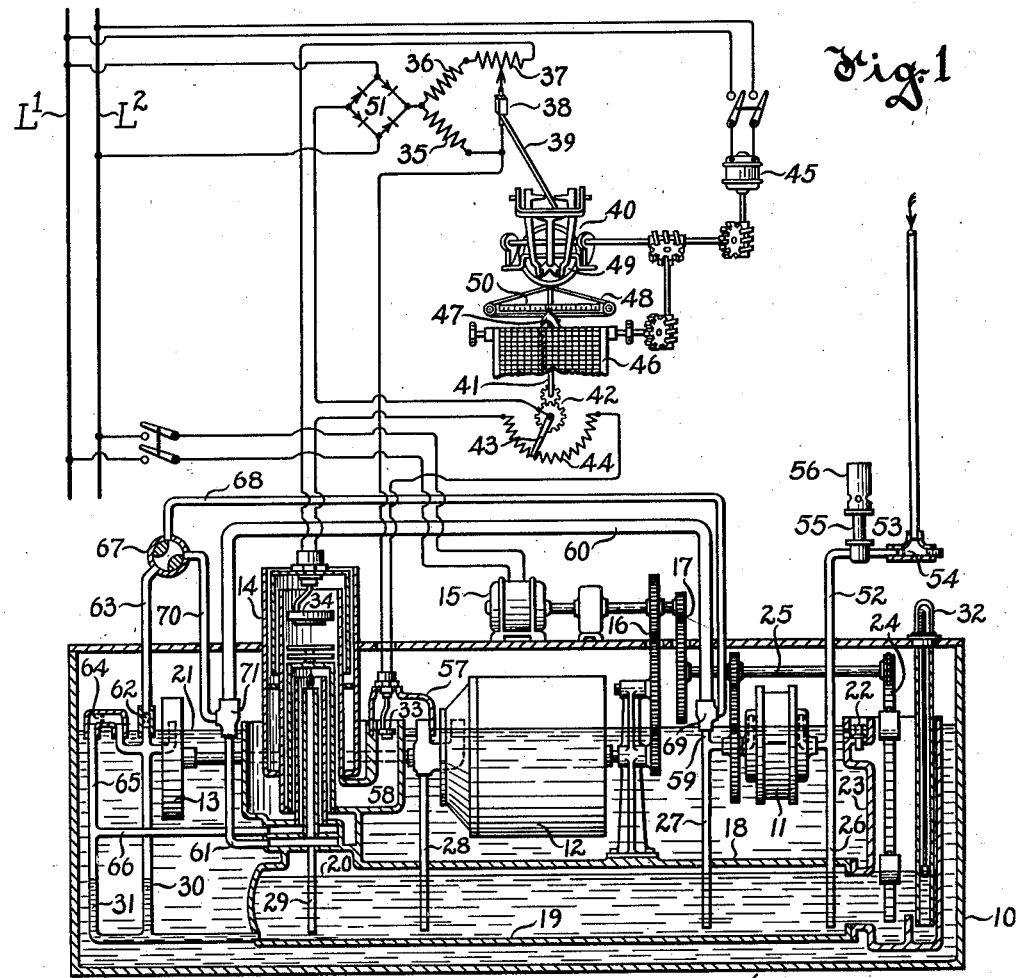
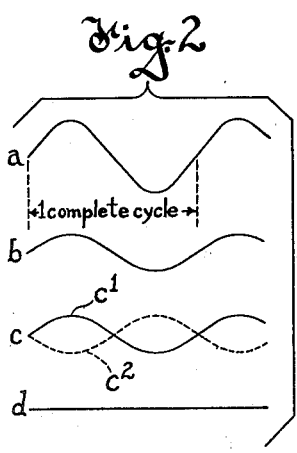
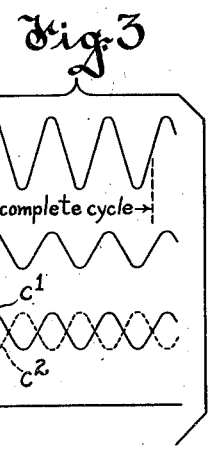
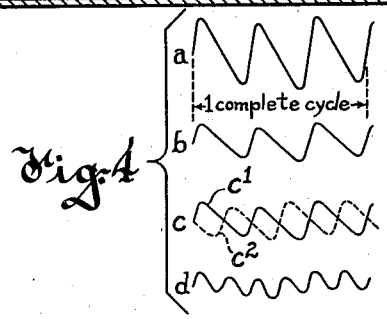
Inventor
Edwin X. Schmidt
By Frank H. Hubbard
Attorney Patented Jan. 19, 1937

2,068,436

UNITED STATES PATENT OFFICE 2,068,436

APPARATUS FOR DETERMINING THE TOTAL HEATING VALUE PER UNIT VOLUME OF COMBUSTIBLE GASES

Edwin X. Schmidt, Whitefish Bay, Wis., assignor to Cutler-Hammer, Inc., Milwaukee, Wis., a corporation of Delaware Application April 25, 1935, Serial No. 18,188

9 Claims. (Cl. 73—190)

This invention relates to improvements in apparatus for determining the total heating value per unit volume of combustible gases. The invention relates more particularly to calorimetric apparatus wherein apparent variations in the total heating value per unit volume of the test gas due to pulsations in the volumetric rate of supply thereof are minimized or substantially eliminated.

An object of the invention is to generally improve known apparatus for determining the total heating value per unit volume of combustible gases.

Another object is to provide apparatus affording a more accurate determination of the total heating value per unit volume of a combustible gas than has been possible with the apparatus of the prior art.

Another object is to provide for attainment of the aforementioned novel results in a simple and inexpensive manner.

Another and more specific object is to provide novel apparatus for reducing the weave in recordings on relatively high B. t. u. range calorimeter charts due to pulsations in the volumetric rate of supply of the test gas by the pump or meter.

Another object is to provide apparatus of the character aforementioned wherein and whereby the time lag in the calorimetric determinations is minimized.

Another object is to provide a novel and simple piping attachment for calorimeters of known form whereby the accuracy and consequent utility of such calorimeters is greatly increased.

Another object is to provide calorimetric apparatus enabling reduction in the degree of accuracy required in the construction and operation of the pump or meter employed to supply the test fluid.

Other objects and advantages of the invention will hereinafter appear.

In the manufacture of gas meters for calorimeters it is not commercially practicable to build meters which are absolutely symmetrical. The result is that the volumetric rate of delivery of gas from the meter, which is driven at a constant speed, is not uniform, but has a cycle whose period is the same as the period of one revolution of the gas meter. In a calorimeter of the type herein disclosed this period depends upon the range of the calorimeter and is numerically equal, expressed in seconds, to the range of the instrument multiplied by 0.171. Thus, on a 1500 B. t. u. range instrument the cycle has a period of 0.171 times 1500, or 256.5 seconds. The cyclic delivery of the gas meter produces a corresponding cyclic delivery of heat to the burner with the usual piping arrangement,—a cycle which is reflected in an objectionable cycle or weave on the recorder chart. Such cycle is particularly objectionable on high heating value range calorimeters. On low range instruments of say, 700 B. t. u. and below, the cycle is sufficiently short so that the heat inertia of the burner parts smoothes out the weave so that it is not particularly objectionable.

By introducing a great amount of capacity between the burner and the point where the gas meets the primary combustion air, considerable diffusion would result, and the aforementioned objectionable weave would be smoothed out to a considerable extent. But the use of a large capacity as just described would materially increase the time lag of the instrument in responding to variations in the quality or total heating value per unit volume of the gas being tested.

My invention contemplates utilization of a principle which is entirely different from the time lag principle just mentioned, and involves or comprises essentially the use of a novel form of piping which makes it possible to not only reduce or substantially eliminate the weave aforementioned, but to also reduce or minimize the time lag of the instrument.

The accompanying drawing illustrates an embodiment of my invention which will now be described, it being understood that the invention is susceptible of embodiment in other forms without departing from the scope of the appended claims.

In the drawing, Figure 1 illustrates schematically and diagrammatically a known form of recording calorimeter having my improved form of piping incorporated therein for the purpose and with the results hereinafter more fully described, and Figs. 2, 3 and 4 are graphic illustrations of certain calorimetric values and of the results of modifying and combining such values in accordance with my invention.

To facilitate an understanding of the principle utilized in carrying out my invention, let it be assumed that the gas meter discharge or delivery rate follows approximately a sine weave whose amplitude is plus or minus one per cent. from the mean or average delivery rate. I then prefer to mix with this gas flow a substantially constant or uniform flow of air equal in rate to the mean rate of gas flow. The resulting mixed flow will have a total heating value per unit volume equal to one-half that of the gas, with a sine weave of plus or minus almost exactly one-half per cent. amplitude. In other words, the mixed flow of gas and air will be twice the mean rate of gas flow, with a sine weave of plus or minus one-half per cent. At the point directly after the junction of the air and gas flows the cycles of mixture heating value and mixture flow are in phase. That is to say, at the instant when the gas flow is at a maximum the mixture heating value is also at a maximum. It follows that the total amount of potential heat available at this point at any instant depends upon the instantaneous rate of delivery of gas by the meter. By the use of a proper kind and amount of capacity between this point and the point at which the gas is actually consumed, a phase displacement results at that end of the capacity adjacent to the calorimeter burner.

By interposing, between the point at which said flows of air and gas are initially mixed and the point of combustion of the mixture, a pipe having a capacity equal to the capacity of the gas meter per revolution, and by employing the aforementioned flow of air for mixture with the gas, a phase displacement of 180 degrees or one-half of the cycle of the gas meter is obtained. Under these conditions the total heating value per unit volume of the mixture of gas and air at a point adjacent to the point of combustion thereof will be at a maximum when the instantaneous volumetric rate of discharge of gas from the meter is at a minimum. Inasmuch as the value of the total heat liberated is equal to the product of the instantaneous total heating value per unit volume and the instantaneous volumetric rate of flow, it follows that the value of the total heat liberated will be substantially free from pulsating variations, if the gas meter delivery rate has a cycle wherein the weave or pulsations in the second half of the cycle are the same as in the first half, but in the opposite direction.

The most common cycle encountered in respect of meters produced for use in calorimetry is a cycle due to meter eccentricity,—a cycle which theoretically is perfectly compensated for and nullified by my invention. Another cycle encountered in the manufacture of calorimeters of the type herein contemplated has a period corresponding to one-third of a revolution of the gas meter. This cycle is somewhat irregular and does not exactly follow a sine weave or it, too, would be perfectly compensated for by the aforementioned phase displacement of one-half of the complete cycle of one revolution of the gas meter. Due to the irregularities in the weave just mentioned the compensation is less perfect, but it is in the proper direction. The weave in the curve of total heat liberated is therefore not only reduced in magnitude, but the frequency of the weave is doubled, which, due to the heat inertia of the burner parts, further reduces the weave in the final calorimeter record.

Except for low heating value gases, say, 700 B. t. u. and below, the addition of an equal volume of air to one of gas does not give sufficient primary air for combustion. In order to insure satisfactory burning, additional air is added to the mixture of half air and half gas at a point close to the actual point of burning. Due to the fact that there is no appreciable time lag between the point where this additional air is added and the point where burning occurs, no objectionable phase displacement results and the uniform evolution of heat is not affected.

Referring now to Fig. 1 of the drawing, wherein I have illustrated a calorimeter which is in general of the character disclosed in the prior patents of H. N. Packard, No. 1,625,277, dated April 19, 1927, and No. 1,662,802, dated March 13, 1928. Following the disclosures of said Packard patents, I provide a tank 10 within which are mounted three wet displacement meters 11, 12 and 13, which are respectively adapted to supply test gas, cooling air and combustion air in quantities bearing a substantially constant ratio or volumetric proportionality with respect to each other. The three pumps, which are shown more or less diagrammatically may preferably be structurally and functionally similar to the corresponding pumps shown in the patent to J. S. Peoples, No. 1,393,824, dated October 18, 1921. Thus the cooling air supply pump 12 is preferably of the cast aluminum water-sealed screw conveyor type operating in the same manner as a water-sealed gas meter. However, the gas pump 11 and combustion air pump 13 each preferably consists of a cast metal base or body having a number of equally spaced angularly extending tubular passages formed therein by a machining operation,—and the same likewise operate in the manner of a water-sealed gas meter.

The gas burner and heat exchange device of the calorimeter is designated in general by the numeral 14. The three fluids aforementioned are supplied to said device by the respective pumps,—the latter having a common liquid seal comprising water or the like contained within tank 10. Said pumps are driven at predetermined speeds relatively to each other as by means of a single motor 15,—pumps 12 and 13 being driven at like speeds through the medium of gearing 16, and pump 11 being driven at a relatively slower speed through the medium of gearing 17.

In practice the aforedescribed pumps are mounted upon a common support 18 located within tank 10 and provided with an internal chamber 19 to contain a reserve quantity of the sealing liquid,—the level 20 of liquid within said chamber being maintained below the level 21 of the liquid in tank 10. An overflow pipe or weir 22 serves to connect the interior of tank 10 with the interior of chamber 19 and also to determine or limit the height of liquid within the former. Said weir is carried by and empties into a tubular portion 23 which is rigidly connected with the support 18 and extends above the level 21 of liquid in tank 10 to connect chamber 19 with the atmosphere. As shown, a chain and bucket type of pump 24 extends downwardly into the tubular portion 23 and is driven through shaft 25 by motor 15 for conveying continuously from the chamber 19 to tank 10 a quantity of liquid somewhat in excess of that which is lost from the tank due to evaporation and other causes. The excess of liquid so supplied to the tank is adapted to flow back into the chamber 19 by means of the weir 22. Also the several fluid conduits of the calorimeter are provided with self-draining tubes 26 to 31, inclusive, which discharge into chamber 19 below the surface of the liquid therein for sealing thereof. Liquid may be introduced into the chamber 19 through the tubular portion 23 at any time, a gauge glass 32 or the like being preferably provided for indicating the height of liquid therein. No definite height of liquid within the chamber 19 need be maintained, provided the quantity of such liquid be sufficient to provide for continuous operation of pump 24 and also provided the level of liquid within the aforedescribed drain pipes be maintained well below the seals of the fluid pumps aforementioned.

Resistance thermometers 33 and 34 are so associated with device 14 as to be subjected respectively to the temperature of the cooling fluid, supplied by pump 12, before and after the heat exchange. Said resistance thermometers are electrically connected to respectively form the major portions of two arms of the well known Wheatstone bridge circuit described in the aforementioned Packard patents; suitable fixed resistances 35 and 36 being adapted to form the other arms of the bridge. The Wheatstone bridge circuit may be initially balanced by means of a suitable variable resistance 37,—a galvanometer coil 38 being connected across the bridge circuit and the needle 39 associated therewith being utilized in connection with a well known form of control mechanism to automatically effect re-balancing of the bridge circuit.

Such control mechanism is indicated in general at 40, and is of the character disclosed in Patent No. 1,125,699, dated January 19, 1915, to Leeds. Thus the coil 38 effects deflection of the needle 39 whose direction and extent of deflection control the direction and extent of rotation of the shaft or movable structure 41,— which acts through gearing 42 to effect sliding movement of contactor 43 over the resistance 44 to equalize the resistance values of the arms containing the respective thermometer resistances 33 and 34 whereby the bridge circuit is balanced automatically during testing of the combustible gas supplied by pump 11.

In other words, the deflecting system of the galvanometer controls a disengageable mechanical connection between the electric motor 45 and the shaft 41 whose direction and extent of movement depend upon the direction and extent of deflection of the needle 39. The recording chart or sheet 46 is advanced at a constant rate by the motor 45 past the marker or pen 47 which is moved transversely of the record sheet by a flexible connection 48 between the same and the disk 49 which carries shaft 41. A portion of the pen 47 is adapted to coact with a suitable calibrated stationary scale 50 to indicate directly the instantaneous total heating value per unit volume of the combustible fluid being tested.

Lines L¹ and L² represent a suitable source of alternating current,—a rectifier system 51 of the well-known copper oxide type being interposed between said source of current supply and the Wheatstone bridge circuit.

The test gas is admitted to the pump 11 through an intake conduit 52, a pressure regulating device indicated generally at 53 being provided for insuring that the pressure of the gas at the intake side of said gas pump shall be maintained at atmospheric pressure. Said pressure regulating device preferably comprises a barrier 54 located within conduit 52 and provided with a relatively small opening and a burner branch pipe 55 connecting said conduit 52 on the pump side of said barrier directly with the atmosphere. In operation the barrier 54 serves to restrict the flow of gas therebeyond to a value which is able to escape through the pipe 55 without raising the pressure upon the pump side of said barrier above atmospheric pressure, whereas the outward flow of gas through said pipe 55 effectively prevents induction of air into the pump. The gas so issuing from the pipe 55 is ordinarily ignited and burned to avoid pollution of the surrounding air,—a protective hood or jacket 56 being provided adjacent to the upper end of pipe 55. Such continuous efflux of an appreciable quantity of gas from pipe 55 serves to insure that the test gas drawn into the pump 11 constitutes a true sample of the main supply undergoing test.

In the operation of the fluid pumps aforedescribed it is apparent that the three gases handled thereby are subjected to like intimate contact with the water or other sealing liquid whereby all of said gases are adapted to assume the temperature of said water and moreover to become saturated therewith at such common temperature. Further the interior of tank 10 preferably has sufficient open communication with atmosphere to permit both air pumps 12 and 13 to draw directly from atmosphere and consequently the air enters said pumps at atmospheric pressure.

The cooling air furnished by pump 12 is supplied to the heat exchange device 14 through the passage 57, 58 in substantially the manner disclosed in said Packard patents, and with a corresponding function. The gas sample is conveyed from pump 11 to the calorimeter burner through piping 59, 60, 61,—the essential feature of which is the enlarged size or capacity of the section 60 thereof. Thus the arrangement is preferably such that the capacity of the piping between pump 11 and said burner is equal to the capacity of pump 11 during one complete revolution or cycle of operation of the latter.

The pump 13 is adapted to supply to the burner both primary and secondary air for supporting combustion of the test gas sample supplied by pump 11. The primary combustion air flows through an orifice or restriction 62 and pipe 63 and the secondary combustion air flows through an orifice 64 and piping 65 and 66. On calorimeters having ranges of, say 900 B. t. u. and above, on which it is desirable to compensate, the arrangement is preferably such that the primary air is split into two streams, as by means of a two-way orifice or valve 67; one of the streams passing through pipe 68 to provide for mixture thereof with the test gas sample at the discharge end of pump 11, as indicated by the connection 69, and the other stream passing through pipe 70 for uniting thereof with the mixture of gas and air which has flowed through pipe section 60, as indicated by the connection 71. The purpose of this arrangement is as follows: On the higher range calorimeters the gas meter 11 moves so slowly that slight irregularities in the volumetric rate of delivery result in a weave or periodic variation in the chart record or indication. These irregularities may be due to eccentricity of the mounting of pump 11, or to unequal deposits or corrosion or to slight differences in machining of the several tubular passages formed in the pump body. By splitting the supply of primary combustion air and properly proportioning the two parts thereof, in conjunction with the use of a proper kind and amount of capacity between pump 11 and the burner, the wave in the gas meter delivery rate can be compensated for or nullified, as aforestated. The proper condition exists when the volumetric rate of flow of primary air through pipe 68 is exactly the same as or equal to the mean or average volumetric rate of discharge of gas from pump 11, it being understood that the cross sectional area of pipe 60 is just sufficient to accommodate the combined flows of test gas and air without effecting any substantial degree of diffusion between the adjacent waves of the gas flow. In other words, the capacity in conduit 60 is provided by selecting the proper length thereof rather than by merely selecting a pipe having the required cubical or volumetric capacity.

The proper adjustment of valve 67 is effected during assembly of the calorimeter at the factory, and such adjustment depends upon the particular range of the calorimeter. Thus, to determine the proper adjustment of valve 67, it may be noted that the time lag of the piping from meter 11 to the burner should be one-half the time required for one revolution of the gas meter, or .0855 times the full range of the instrument, expressed in seconds. For example, this lag for a 1200 B. t. u. range calorimeter should be .0855 times 1200, or 102.6 seconds. To obtain this adjustment the piping at the outlet of gas meter 11 may be raised or disconnected and the gas blown out of the piping by the operator through the medium of an inserted piece of rubber tubing. The piping is then replaced or reconnected, and the operator notes the length of time required before the calorimeter burner can be re-lighted. The orifice 67 is adjusted by the operator as required until the predetermined or proper time lag is effected.

Referring now to Fig. 2. The line $a$, which is approximately in the form of a sine weave, represents the value of the periodic variations of the volumetric rate of discharge of gas from the meter 11,—it being noted that one complete period of the weave coincides with or corresponds to one complete cycle of operation or rotation of meter 11. The line $b$ represents the effect of adding at connection 69 the flow of air from pipe 68,—or, in other words, the weave in both the volumetric rate of flow and the total heating value per unit volume of the preliminary mixture of gas and air adacent to the aforementioned connection 69.

The graph $c$ is composed of the full line $c^1$ which represents the weave in the volumetric rate of flow of the mixture of gas and air at a point adjacent to the connection 71; whereas the dotted line $c^2$ represents the heating value per unit volume of the preliminary mixture of gas and air adjacent to the connection 69. As will be noted, the lines or weaves $c^1$ and $c^2$ are 180 degrees out of phase with respect to each other.

The straight line $d$ represents the value of the potential energy flowing at a point adjacent to the connection 71,—and is the resultant of the values represented by the aforementioned lines $c^1$ and $c^2$. As aforestated, the time lag from the connection 71 to the calorimeter burner is practically zero, and hence the line $d$ likewise represents the value of the potential energy supplied to the calorimeter burner.

The aforedescribed graphic lines are based upon the assumption that there was no change in the total heating value per unit volume of the test fluid,—since obviously any variation in the actual total heating value per unit volume of the test fluid would be accurately reflected in a corresponding upward or downward displacement of the horizontal line or value $d$. It is to be particularly noted, however, that by my arrangement of elements the effect of the weave or periodic variations in the volumetric rate of supply of gas by meter 11 is entirely nullified or eliminated prior to actual combustion of the test gas, and hence a proper and fully accurate record will be made upon the calorimeter chart.

Fig. 3 graphically illustrates the manner in which compensation is effected in respect of a meter whose volumetric rate of discharge has an approximate sine weave whose period is equal to one-third of the period corresponding to a complete cycle of operation or rotation of the meter. Thus lines $a$, $b$, $c^1$, $c^2$ and $d$ represent values of the character set forth in the discussion of Fig. 2; and a corresponding perfect compensation for variations in the instantaneous volumetric rate of discharge of the gas meter is effected.

In Fig. 4 the graphs are in general quite similar to those of Fig. 3,—but in this instance the variations in the instantaneous volumetric rate of discharge of the gas meter do not so closely approximate a sine weave. The irregular line $d$ in this figure, which represents the value of the potential total heat flow to the burner, involves pulsations of such small magnitude and of so great frequency that the line will be substantially smoothed out by the heat inertia of the burner parts, and hence no objectionable degree of weave will be transmitted to the calorimeter chart.

The advantages of my invention will be apparent to those skilled in the art. Thus it will be obvious that my invention enables or permits use of complete calorimeters, or at least of gas meters incorporated therein, for calorimetry of relatively high range B. t. u. gases, which calorimeters or meters would otherwise be unadapted for commercial use. The additional piping and valve arrangement necessary to provide for accomplishment of the novel results contemplated by me are relatively inexpensive both in construction and in cost of assembly thereof. Moreover, my improvement is of such character that the necessary changes in known forms of calorimeters previously installed may be readily effected at a minimum of expense, with the aforedescribed great improvement in the accuracy of the values recorded upon the calorimeter chart.

While I have shown herein but one form of calorimeter, it is to be understood that my invention is applicable to any form of calorimeter embodying either an escapement controlled or power driven gas meter the rate of discharge of which inherently is or is likely to become of a pulsating character.

Although for obvious reasons I prefer to provide for a time lag equal to one-half of the period of the cyclic variations in the volumetric rate of flow of test gas supplied to the burner, it is to be understood that similar results are obtainable by providing for a time lag equal to uneven multiples of said period; as, for instance, one and one-half times the period, two and one-half times the period, etc. In practice, especially where gas mixing is to be controlled by the calorimeter, a minimum time lag in the response to variations in quality or total heating value per unit volume of the test gas is desired.

What I claim as new and desire to secure by Letters Patent is:

1. In a calorimeter, in combination, a burner, means to supply to said burner a continuous sample of test fluid to be burned to provide for ascertainment of the total heating value per unit volume thereof, said means comprising a pump of the positive displacement type which is operable repeatedly throughout a predetermined cycle, means comprising piping for effecting a flow of said test fluid between said pump and said burner which is volumetrically equal to the volume of fluid discharged by said pump during a predetermined portion of a complete cycle of operation of the latter, means for combining with said flow of test fluid a substantially equal flow of fluid adapted to support combustion thereof, to thereby effect a predetermined phase displacement between the instantaneous heating value per unit volume of the composite flow of said fluids at a point adjacent to said burner and the instantaneous volumetric rate of flow of the test fluid at the discharge end of said pump, whereby the volumetric rate of supply of said test fluid to said burner is maintained substantially constant irrespective of the inherent variations in the volumetric rate of discharge thereof from said pump.

2. In a calorimeter, in combination, a burner, means to supply to said burner a continuous sample of test fluid and a continuous substantially proportional flow of fluid to support combustion thereof to provide for burning of said test fluid and ascertainment of the total heating value per unit volume thereof, the means for supplying said test fluid comprising a pump of the positive displacement type which is operable repeatedly throughout a predetermined cycle, means comprising piping for affording a composite flow of said test fluid and a portion of said combustion supporting fluid flow between said pump and said burner which is volumetrically equal to the quantity of test fluid discharged by said pump during a complete cycle of operation of the latter, the volumetric rate of flow of said portion of combustion supporting fluid being substantially equal to the mean rate of discharge of test fluid from said pump, to thereby reduce by substantially one-half the magnitude of the weave or potential variation in the instantaneous total heating value per unit volume of said composite flow of test fluid and combustion supporting fluid at a point adjacent to said burner, said piping also effecting a phase displacement of substantially one hundred and eighty degrees between the instantaneous total heating value per unit volume of said composite flow at a point adjacent to said burner and the instantaneous volumetric rate of discharge of the test fluid from said pump, whereby the value of the total heat liberated by combustion of said test fluid at said burner is maintained substantially free from pulsating variations notwithstanding any inherent variations in the volumetric rate of discharge of the test fluid by said pump.

3. In a calorimeter adapted to substantially eliminate apparent variations in the instantaneous total heating value per unit volume of a combustible test fluid as an incident to pulsations in the volumetric rate of discharge thereof from a source of supply, in combination, a continuously rotating pump of the positive displacement type, said pump being adapted to supply a continuous sample of combustible fluid the total heating value per unit volume of which is to be ascertained, a burner to which said sample is to be supplied, means comprising piping interposed between the discharge end of said pump and said burner, said piping having a capacity substantially equal to the capacity of said pump during one complete cycle of rotation thereof, means for supplying to said piping jointly with said combustible sample a flow of fluid adapted to support combustion of the latter, the volumetric rate of flow of said combustion supporting fluid being substantially equal to the mean volumetric rate of discharge of the combustible fluid from said pump, whereby the magnitude of the weave or potential variation in the instantaneous total heating value per unit volume of the composite flow in said piping is substantially reduced, said piping also serving to effect a phase displacement of substantially one hundred and eighty degrees between the instantaneous total heating value per unit volume of said composite flow at a point adjacent to said burner and the instantaneous volumetric rate of discharge of the combustible fluid from said pump, to thereby afford an accurate continuous determination of the total heating value per unit volume of said combustible fluid regardless of pulsations in the volumetric rate of supply thereof by said pump.

4. In a calorimeter, in combination, a cyclically operated wet displacement meter through which combustible test gas is adapted to flow, means for compensating for apparent variations in the heating value per unit volume of said test gas as an incident to pulsations in the volumetric rate of discharge of said meter, said means comprising means for effecting a flow of another gas and for combining the latter with said test gas to produce a mixed gas at a rate which is approximately double the mean rate of supply of the test gas and of approximately one-half the heating value per unit volume of the test gas, said means providing for a relative rate of flow variation of the mixed gas which is approximately one-half as great as the relative rate of flow variation of the test gas per se, whereby the mixed gas heating value varies to the same degree as the variation in the relative rate of flow of mixed gas, a burner to which said mixed gas is supplied and in which the same is burned, and means comprising a preselected continuous capacity interposed between the point where said gases are initially mixed and said burner, said capacity being adapted to effect at said burner a predetermined phase displacement between the cyclic variations in the heating value of the mixed gas and the cyclic variations in the volumetric rate of flow of said mixed gas.

5. In a calorimeter, in combination, a cyclically operated wet displacement meter through which combustible test gas is adapted to flow, means for compensating for apparent variations in the heating value per unit volume of said test gas as an incident to pulsations in the volumetric rate of discharge of said meter, said means comprising means for effecting a flow of combustion supporting fluid at a volumetric rate which is substantially equal to the mean volumetric rate of flow of the test fluid, means for combining said flows of fluids at the point of discharge of said test fluid from the meter and for effecting a combined flow of said fluids at the normal rate, said last mentioned means providing a length of the combined flow such that the volume thereof is equal to the volumetric discharge of said meter during one complete cycle of operation thereof, to thereby effect a predetermined phase displacement between the instantaneous heating value per unit volume of the combined flow of fluids at said burner and the instantaneous rate of discharge of the test fluid from said meter, whereby the value of the heat liberated by combustion of the combined flow of fluids at said burner is maintained substantially free from pulsating variations.

6. In a calorimeter, in combination, a burner, cyclically operated means for supplying a continuous flow of combustible test gas to said burner for combustion thereat, means for compensating for cyclic variations in the volumetric rate of flow of test gas so supplied, said means comprising means for adding to said test gas at a uniform rate a gas which is not combustible in air, said means also comprising a continuous and uniform volumetric capacity interposed between said burner and the point where said second mentioned gas is added, said volumetric capacity being so proportioned as to effect a time lag equal to one-half, or uneven multiples of one-half, of the period of said cyclic variations in the volumetric rate of supply of the test gas, whereby the rate of liberation of heat upon combustion of the combined flows of said gases at said burner is substantially unaffected by said cyclic variations.

7. In a calorimeter, in combination, a burner, a cyclically operated displacement meter adapted to supply to said burner a continuous flow of combustible test fluid for combustion thereat, means for compensating for apparent variations in the heating value per unit volume of said test fluid as an incident to pulsations in the volumetric rate of discharge of said meter, said means comprising means for effecting a flow of combustion supporting fluid the volume of which is substantially equal to the mean volumetric rate of flow of the test fluid, means for combining said flows of fluids at a point adjacent to the point of discharge of the test fluid from said meter, whereby the magnitude of said apparent variations in the heating value per unit volume of the test fluid is reduced substantially fifty per cent., means comprising a continuous capacity interposed between the point at which said fluids are combined and said burner for insuring a normal rate of the combined flow of fluids, said capacity being equal in volume to the volumetric discharge of said meter during one complete cycle of operation of the latter, to thereby effect a predetermined phase displacement between the instantaneous heating value per unit volume of the combined flow of fluids at said burner and the instantaneous rate of flow of the test fluid at the discharge end of said meter, and said phase displacement being such that the instantaneous value of the heat liberated upon combustion of the test fluid at said burner remains substantially free from pulsating variations irrespective of the inherent variations in the rate of discharge thereof from said meter.

8. In a calorimeter, in combination, a burner, a cyclic wet displacement meter through which a combustible test fluid is passed for supply thereof to said burner, means for substantially eliminating the apparent variations in the instantaneous total heating value per unit volume of said fluid as an incident to pulsations in the volumetric rate of discharge thereof from said meter, said means comprising means for effecting a flow of said fluid, after discharge thereof from the meter, which is equal in volume to substantially one-half of the volume supplied by said meter during one complete cycle of operation thereof, and means for effecting a substantially volumetrically equal flow of air and for combining the same with said flow of test fluid at the point of discharge of the latter from said meter, to thereby produce a phase displacement of approximately one hundred and eighty degrees between the pulsations in the instantaneous volumetric rate of discharge of the test fluid from said meter and the pulsations in the volumetric rate of flow of the test fluid at said burner, whereby the value of the heat liberated by combustion of said test fluid is rendered substantially free from fluctuations incident to pulsations in the volumetric rate of flow of said test fluid.

9. In a calorimeter, in combination, a burner, a pump of the positive displacement type, means for effecting relatively constant speed operation of said pump to provide for a continuous normal flow to said burner of a combustible fluid the total heating value per unit volume of which is to be ascertained, means for controlling the length of said flow to provide for a volume thereof between the discharge end of said pump and said burner which is equal to substantially one-half of the volume discharged by said pump during one complete cycle of operation thereof, and means for combining with said flow of combustible fluid at the discharge end of said pump a volumetrically equal flow of air, to thereby effect a phase displacement of substantially one hundred and eighty degrees between the instantaneous volumetric rate of flow of said combustible fluid at said burner and the instantaneous volumetric rate of discharge thereof from said pump, whereby the value of the total heat liberated by combustion of said combustible fluid is substantially unaffected by the variations in the volumetric rate of discharge thereof from said pump.

EDWIN X. SCHMIDT.